US012493660B2

(12) United States Patent
Mecca

(10) Patent No.: US 12,493,660 B2
(45) Date of Patent: Dec. 9, 2025

(54) APPARATUS AND METHOD FOR COMMUNICATION WITH AN INTERMODAL TERMINAL

(71) Applicant: PortPro Technologies, Inc., Jersey City, NJ (US)

(72) Inventor: Michael Mecca, Jersey City, NJ (US)

(73) Assignee: PortPro Technologies, Inc., Jersey City, NJ (US)

( * ) Notice: Subject to any disclaimer, the term of this patent is extended or adjusted under 35 U.S.C. 154(b) by 0 days.

(21) Appl. No.: 18/584,209

(22) Filed: Feb. 22, 2024

(65) Prior Publication Data

US 2025/0272339 A1   Aug. 28, 2025

(51) Int. Cl.
*G06F 16/951*  (2019.01)
*G06Q 10/1093* (2023.01)

(52) U.S. Cl.
CPC ....... *G06F 16/951* (2019.01); *G06Q 10/1095* (2013.01)

(58) Field of Classification Search
CPC .......................... G06Q 10/1095; G06F 16/951
See application file for complete search history.

(56) References Cited

U.S. PATENT DOCUMENTS

| | | | |
|---|---|---|---|
| 6,831,663 B2* | 12/2004 | Chickering ............ | G06Q 10/02 707/999.102 |
| 11,587,018 B2 | 2/2023 | Bourland et al. | |
| 11,593,750 B2 | 2/2023 | Sandberg et al. | |
| 2004/0133458 A1* | 7/2004 | Hanrahan .......... | G06Q 10/0631 705/7.22 |
| 2008/0004928 A1* | 1/2008 | Trellevik .......... | G06Q 10/0831 705/331 |
| 2008/0189146 A1* | 8/2008 | Salloum ............... | G06Q 10/025 705/6 |
| 2008/0195462 A1* | 8/2008 | Magdon-Ismail .......................... | G06Q 30/0204 705/7.33 |
| 2012/0191531 A1* | 7/2012 | You ....................... | G06F 16/958 705/14.42 |
| 2013/0346234 A1* | 12/2013 | Hendrick ........... | G06Q 30/0601 705/26.7 |
| 2014/0040248 A1* | 2/2014 | Walsham ............ | G06F 16/9535 707/723 |

(Continued)

OTHER PUBLICATIONS

Container terminal logistics systems collaborative scheduling based on multi-agent systems. Li, Bin; Li, Wen-Feng. Computer Integrated Manufacturing Systems 17.11: 2502-2513. Editorial Department of CIMS. (Nov. 2011).*

(Continued)

*Primary Examiner* — Timothy Padot
(74) *Attorney, Agent, or Firm* — Caldwell Intellectual Property Law

(57) ABSTRACT

An apparatus and method for communication with an intermodal terminal. The apparatus includes a processor configured receive a plurality of appointment datasets, aggregate the plurality of appointment datasets by synthesizing the plurality of data points to form an integrated terminal event dataset, populate a user interface data structure as a function of the aggregated plurality of appointment datasets, receive a user input, generate a terminal event handler as a function of the user input, and modify the user interface data structure by updating the integrated terminal event dataset.

18 Claims, 10 Drawing Sheets

(56) References Cited

U.S. PATENT DOCUMENTS

| | | | |
|---|---|---|---|
| 2016/0350721 A1* | 12/2016 | Comerford | H04L 67/306 |
| 2019/0213538 A1 | 7/2019 | Bebout et al. | |
| 2022/0343081 A1* | 10/2022 | Gnanasambandam | ............... |
| | | | G16H 50/20 |
| 2023/0078448 A1* | 3/2023 | Cella | G06Q 10/06311 |
| | | | 705/7.13 |
| 2023/0267386 A1* | 8/2023 | Lindahl | G06Q 10/06315 |
| | | | 705/330 |
| 2024/0069963 A1* | 2/2024 | Gharaybeh | G06N 3/044 |

OTHER PUBLICATIONS

Dynamic Scheduling of Handling Equipment at Automated Container Terminals. Meersmans, PJM; Wagelmans, APM. Ideas Working Paper Series from RePEc St. Louis: Federal Reserve Bank of St Louis. (2001).*

T. Q. Le, S. Rianmora and P. Kewcharoenwong, "Intermodal network design in freight transportation systems," 2018 Thirteenth International Conference on Knowledge, Information and Creativity Support Systems (KICSS), Pattaya, Thailand, 2018, pp. 1-6.*

Automated Time Slot Management and Dock Scheduling Software; GoRamp website; https://www.goramp.com/time-slot-management Date: Nov. 17, 2023.

Truck Appointment System; APMTerminals website; https://www.apmterminals.com/en/mobile/e-tools/truck-appointment-system Date: Nov. 17, 2023.

\* cited by examiner

APPARATUS AND METHOD FOR COMMUNICATION WITH AN INTERMODAL TERMINAL

FIELD OF THE INVENTION

The present invention generally relates to the field of communication with intermodal terminals. In particular, the present invention is directed to an apparatus and method for communication with an intermodal terminal.

BACKGROUND

Data acquisition and data aggregation into systems and methods for communication with intermodal terminals holds significant importance in optimizing and streamlining the scheduling of appointments, as intermodal terminals facilitate the transfer of goods that plays a crucial role in supply chain logistics.

SUMMARY OF THE DISCLOSURE

In an aspect, an apparatus for communication with an intermodal terminal, wherein the apparatus includes at least a processor and a memory communicatively connected to the at least a processor, wherein the memory contains instructions configuring the at least a processor to receive a plurality of appointment datasets, wherein each appointment dataset of the plurality of appointment datasets includes a plurality of data points describing a plurality of terminal events associated with at least an intermodal terminal, aggregate the plurality of appointment datasets by synthesizing the plurality of data points to form an integrated terminal event dataset, populate a user interface data structure as a function of the aggregated plurality of appointment datasets, wherein the user interface data structure includes a visual representation of the integrated terminal event dataset, receive a user input from a user through the populated user interface data structure, wherein the user input includes a selection of a terminal event from the plurality of terminal events and a plurality of corresponding event parameters, generate a terminal event handler as a function of the user input, wherein the terminal event handler is configured to initiate a communication protocol with the respective intermodal terminal of the selected terminal event to convey the plurality of corresponding event parameters and modify the user interface data structure by updating the integrated terminal event dataset as a function of the plurality of corresponding event parameters.

In another aspect, a method for communication with an intermodal terminal, wherein the method includes using at least a processor and a memory communicatively connected to the at least a processor, wherein the memory contains instructions configuring the at least a processor to receive a plurality of appointment datasets, wherein each appointment dataset of the plurality of appointment datasets includes a plurality of data points describing a plurality of terminal events associated with at least an intermodal terminal, aggregate the plurality of appointment datasets by synthesizing the plurality of data points to form an integrated terminal event dataset, populate a user interface data structure as a function of the aggregated plurality of appointment datasets, wherein the user interface data structure includes a visual representation of the integrated terminal event dataset, receive a user input from a user through the populated user interface data structure, wherein the user input includes a selection of a terminal event from the plurality of terminal events and a plurality of corresponding event parameters, generate a terminal event handler as a function of the user input, wherein the terminal event handler is configured to initiate a communication protocol with the respective intermodal terminal of the selected terminal event to convey the plurality of corresponding event parameters and modify the user interface data structure by updating the integrated terminal event dataset as a function of the plurality of corresponding event parameters.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and method for communication with an intermodal terminal.

Aspects of the present disclosure can be used for efficient scheduling using machine-learning techniques analyze historical data, current traffic conditions, and other relevant factors to dynamically optimize appointment schedules, minimizing delays and maximizing overall efficiency. Additionally, the adaptability of ML models to changing conditions ensures real-time adjustments in appointment schedules, contributing to the maintenance of a smooth flow of goods through the intermodal terminals. Another key aspect is the role of ML in enabling data-driven decision-making. By leveraging predictive analytics, ML models utilize historical data to forecast future trends and demand patterns, providing valuable insights that can inform proactive and strategic decision-making in the scheduling process. Overall, the implementation of machine learning in communication systems for intermodal terminals significantly enhances the effectiveness and responsiveness of appointment scheduling, ultimately improving the overall performance of the supply chain.

Exemplary embodiments illustrating aspects of the present disclosure are described below in the context of several specific examples.

Figure 1:
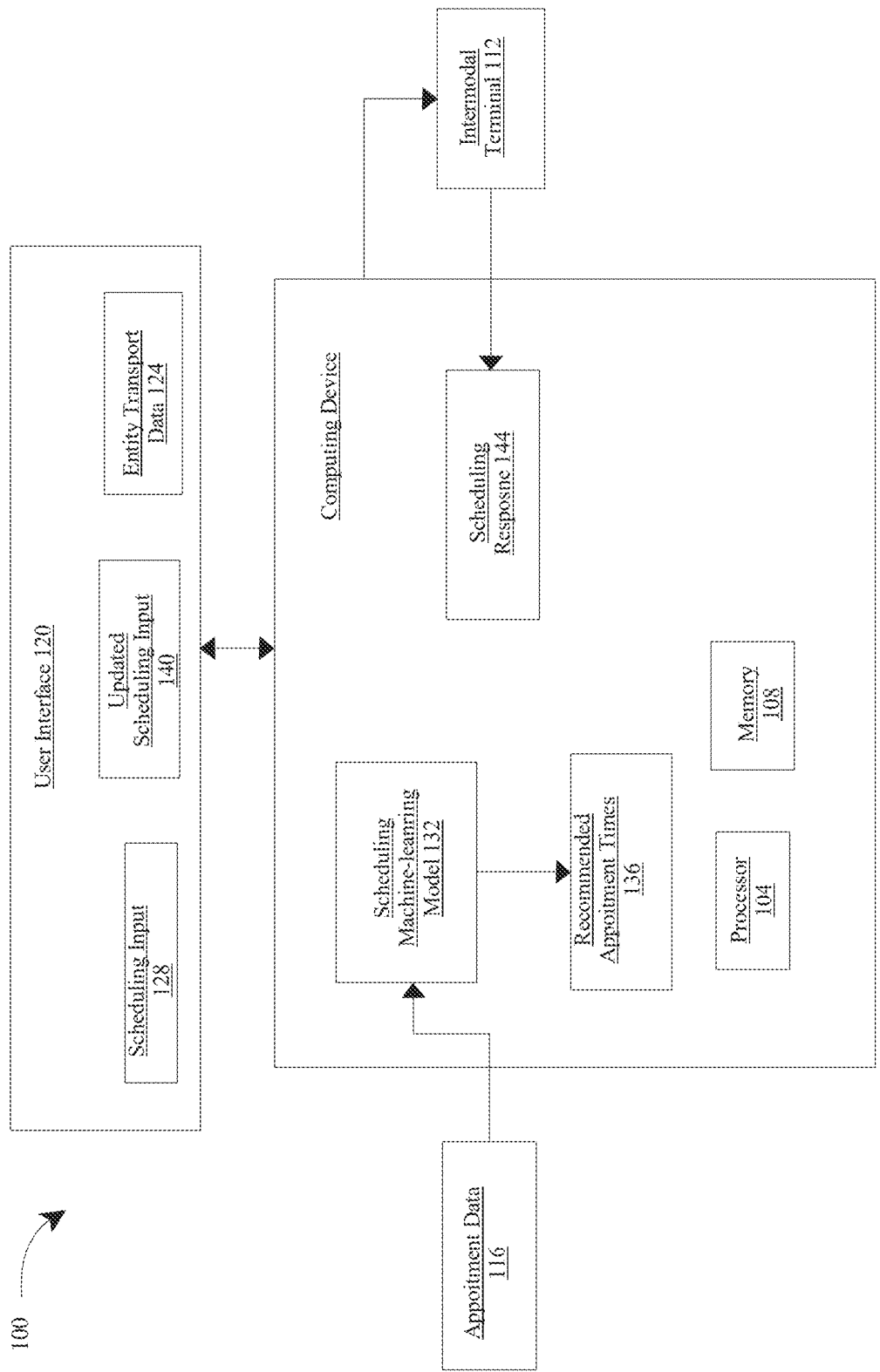
FIG. 1 is a diagram illustrating an exemplary embodiment of an apparatus for communication with an intermodal terminal.

Referring now to FIG. 1, an exemplary embodiment of an apparatus 100 for communication with an intermodal terminal is illustrated. Apparatus includes a computing device. Computing device includes a processor 104 communicatively connected to a memory 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Further referring to FIG. 1, processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, processor 104 is configured to receive a plurality of appointment datasets 116 regarding one or more intermodal terminals 112. An "intermodal terminal," as used herein, is a facility that is responsible for the transfer of freight from one mode of transfer to another. For example, an intermodal terminal 112 may be responsible for the transfer of a cargo container from a ship to a truck. Intermodal terminals 112 contain the proper infrastructure to facilitate the transition between various modes of transport such as but not limited to, from rail to road, from sea to road and the like. "Appointment datasets," as used herein, is information referring to an appointment scheduling of an intermodal terminal 112. Each appointment dataset of the plurality of appointment datasets comprises a plurality of data points describing a plurality of terminal events associated with at least an intermodal terminal. A "terminal event," as used herein, is an event related to allocation and utilization of resources for loading and unloading containers. A terminal event may include any scheduled or unscheduled occurrence, activity, or operation that takes place within or is related to an intermodal terminal 112.

Still referring to FIG. 1, appointment scheduling helps optimize the loading and unloading of containers onto and off container transporters. Generally, carriers, drivers, shipping companies and the like must schedule appointments and book specific time slots that can be used to pick up or drop off containers. The scheduling of appointments ensures that the proper resources and personnel are present when a carrier desires to load or unload a cargo container. Appointment datasets 116 may include any available appointments of the intermodal terminal 112. In some cases, one or more intermodal terminals 112 may be present within one or more geographic locations. The intermodal terminals 112 generally have their own software and systems utilized for appointment scheduling. In one or more embodiments, appointment datasets 116 may include appointments from one or more intermodal terminals 112. The receipt of appointment datasets 116 in one central location facilitates the appointment process for carriers, shipping companies and the like. The receipt of appointment datasets 116 in one central location facilitates the generation of a universal appointment system a described below.

Still referring to FIG. 1, appointment datasets 116 may be received using a web crawler. A "web crawler," as used herein, is a program that systematically browses the internet for the purpose of Web indexing. The web crawler may be configured to scrape appointment datasets 116 from one or more websites of the one or more intermodal terminals 112. In some cases, appointment datasets 116 may be used through API integration, web crawling screen scraping and the like. API integration refers to the process of connecting different software systems through their application programming interfaces (APIs) to allow them to communicate and work together as described further below. APIs define the methods and data formats that applications can use to request and exchange information. A web crawler may be generated by a processor 104 and be trained with information received from an external user through a user interface 120 as described further below.

Still referring to FIG. 1, appointment datasets 116 may be received through an intermodal terminal 112 database communicatively connected to processor 104. Databases may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Still referring to FIG. 1, appointment datasets 116 may be received be received through a user interface 120 communicatively connected to processor 104. A "user interface," as used herein is a point of interaction between a user and a computer program or system. A user interface 120 may include visual, auditory, and tactile elements that allow users to interact with a software application or hardware device. The primary goal of a user interface 120 is to facilitate effective communication between the user and the system, enabling users to interact with and control the system easily. User interface 120 may embody a portal to a plurality of terminal-based websites by scraping, aggregating, and indexing data as described above to be represented through one user inference. User interface 120 may include a Graphical User interface 120 (GUI), which is the visual representation of the software or system. It includes elements such as windows, icons, buttons, menus, and other graphical elements that users can interact with using a mouse, keyboard, or touch input. User interface 120 may include Command Line Interface (CLI) which is a text-based interface where users interact with the system by typing commands. User interface 120 may include input controls such as text fields, checkboxes, radio buttons, dropdown lists, and other input elements that allow users to input data and make selections. User interface 120 may include feedback elements messages, alerts, tooltips, and other feedback mechanisms inform users about the status of their actions, errors, or system responses. User interface 120 may be populated with a plurality of appointment datasets 116 wherein the user interface 120 may visually display appointments of one or more intermodal terminals 112 in one unified system. In one or more embodiments, users may be able to view appointments of one or more intermodal terminals 112 through visualization of graphical elements depicting appointment times. Users may be able to search for particular dates and/or receive information on the next available times. In some cases, the user interface 120 may allow a user to view multiple intermodal terminals 112 in a single window, wherein a user may compare appointments with one or more intermodal terminals 112. In some cases, the user may view availability times such as, for example, when the terminals are operating or when the terminals are closed. In some embodiments, availability may be based on certain types of containers being accepted during aa specific period of time. In some embodiments, user interface 120 may include a chatbot program to receive data and other embodiments as described further below. For example, a chatbot system, may be configured with prompts tailored to gathering entity data and scheduling information. For example, a prompt may include "Pickup or Delivery Type (Select one): a. Import Pickup, b. Export Delivery c. Domestic Pickup/Delivery."

Still referring to FIG. 1, processor 104 is configured to aggregate the plurality of appointment datasets by synthesizing the plurality of data points to form an integrated terminal event dataset. An "integrated terminal event dataset," as used herein, is a data structure indexing and categorizing a plurality of data points of a plurality of appointment datasets and related information. For example, terminal events and other data points may be categorized by intermodal terminal location, dates, data of terminal event, and the like. Synthesizing the plurality of data points may include using a machine-learning model, such as a classifier as described further below, to categorize the plurality of data points based on a parameter, such as timestamps of terminal events. Integrated terminal event dataset may include visuals as described in FIG. 6 below.

Still referring to FIG. 1, processor 104 is configured to populate a user interface data structure of user interface 120 as a function of the aggregated plurality of appointment datasets. A "user interface data structure," as used herein, is a data structure including a visual representation of integrated terminal event dataset." A visual representation may include windows, graphics, and other form of icons that may be displayed to a user through user interface 120 as described throughout this disclosure.

Still referring to FIG. 1, processor 104 is configured to modify the user interface 120 based on the appointment data. Modifying user interface 120 may include adjusting visual or text pertaining to a one or more intermodal terminals 112 based on the appointment data. For example, modification may include changing, canceling, reserving, adding, deleting appointments times regarding availability and/or capacity of an intermodal terminal 112. Modifications may include restricting a user's ability to search for or reserve an appointment at one of more intermodal terminals 112.

Still referring to FIG. 1, processor 104 may be configured to receive entity transport data 124 from a user. A "user," as used herein, is a party seeking to schedule an appointment. "Entity transport data," as described herein, is data associated with the transportation of one or more goods of a business. Entity transport data 124 may include GPS tracking one or more transport vehicles, information relating to the transportation of goods, such as but not limited to, container details (e.g. goods within the container, container sizes, numbers of containers and the type of container), the origin location, the final destination, stops on the way, various invoices associated with the transports, payroll information, Enterprise Resource Planning information and the like. Entity transport data 124 may be received and displayed through a user interface 120 using the same methods of receiving and displaying appointment data. Entity transport data 124 be received through a plurality of websites using a web crawler and/or API integration as described above. For example, entity transport data 124 may be retrieved from a warehouse management system and the like.

Still referring to FIG. 1, processor 104 is configured to receive a user input from a user through the populated user interface data structure, wherein the user input includes a scheduling input, and a plurality of corresponding event parameters. A "user input," as used herein, is data received from a user. A user input includes a user selection of terminal event of the plurality of terminal events. A "scheduling input," as used herein, is a user selection regarding an appointment time. A "corresponding event parameter," as used herein, entity data in relation to a selected terminal event. For example, a corresponding event parameter may include data specifying transport-related details such as, estimated arrival, drop-off times, scheduled pickup time, etc.

Users may be able to select graphical icons depicting available appointment times in order to select available appointments for the intermodal terminals 112. In some cases, users can book in batch and multi-select multiple appointments among a plurality of intermodal terminals 112. Users may be able to schedule appointments relating to unloading and loading of cargo. User input 128 may include selection of one or more appointment times. Inputs may further include windows of available times wherein a user may select multiple windows and a computer schedule one appointment within those windows. Scheduling Inputs may further include the name of the person or entity scheduling the appointment, contact information, container information, Cargo types, estimated arrival and/or drop off times and the required equipment. In some cases, a processor 104 may be configured to input one or more elements needed for scheduling an appointment using entity transport data 124. In one or more embodiments, a user interface 120 may be populated with a plurality of containers and corresponding information wherein processor 104 is configured to transfer portions of entity transport data 124 to populate one or more field needed for appointment scheduling. In some cases, graphical user interface 120 may include one or more interaction components that allow a user to select a cargo container and corresponding information to be used for appointment scheduling. In some cases, the computing device may suggest scheduling inputs based on the arrival time of the containers. For example, a container arriving at a port on a Tuesday may contain a scheduling time one or after Tuesday. This will ensure that appointments are not made prematurely. In some cases, the computing device may scrape the web or a user's data to autofill various required fields needed to schedule appointments. In some cases, the computing device may recommend nearby intermodal terminals 112 based on user data (e.g., entity transport data 124) in which containers can be returned.

Still referring to FIG. 1, processor 104 may implement machine-learning process to recommend and/or automatically book appointment times based on projected arrival dates and times. A scheduling machine-learning model 132 may be trained by processor 104 to receive appointment datasets 116 and entity transport data 124 as inputs and output recommend appointment times, wherein the scheduling machine-learning model 132 training data includes a plurality of data sets correlating appointment datasets 116 to entity transport data 124. Scheduling machine-learning model 132 may implement machine-learning processes and methods as described further below. Scheduling machine-learning model 132 training may be received from a database a described throughout this disclosure. Scheduling machine-learning model 132 training data may include user feedback received through user interface 120 regarding the quality of recommend appointments time previously entered by processor 104. User feedback may be used to training sets of training by removing data that lead to a poorly rated output or prioritizing sets of training data that lead to highly rated output.

Still referring to FIG. 1, scheduling machine-learning model 132 may include an optical character recognition program configured to convert data from appointment data, entity transport data 124, and the like into machine-encoded text. In some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching May work best with typewritten text. In some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted features can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose a nearest match. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks, for example neural networks.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

Still referring to FIG. 1, scheduling machine-learning model 132 may include a language processing program configured to produce associations between one or more words extracted from appointment datasets 116 and entity transport data 124, and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated May include an association between an extracted word, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words.

Still referring to FIG. 1, scheduling machine-learning model 132 may include a classifier. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a process whereby a processor 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. Implementing machine-learning processes improves and optimizes the functioning of processor 104 in terms of efficiency and accuracy based on data acquisition, aggregation, filtration, and displaying techniques as described throughout this disclosure. Without the implementation of a machine-learning model/process, there would be a trade in the performance power of processor 104, such as time and accuracy, in performing such functions. The ability to continuously train a machine-learning model cable of learning to identify new trends or correlations within a fluctuating quantity of data is a benefit that would not be realized otherwise, without the tradeoff in performance efficiency.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\sum_{i=0}^{n}a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

Still referring to FIG. 1, scheduling machine-learning model 132 may include an optimization algorithm. Optimization algorithms are designed to find the best solution to a given problem by systematically exploring possible solutions and selecting the one that optimizes a specific objective function. In the context of schedule creation, the goal is to find an optimal arrangement of tasks or appointments while satisfying various constraints and maximizing or minimizing a certain criterion. The application of optimization algorithms in schedule creation involves defining an objective function and formulating the scheduling problem as an optimization task. The objective function quantifies the goal of the optimization. It could be minimizing the total appointment duration time spent on completing transaction, maximizing resource utilization, or balancing workload distribution. Decision variables represent the parameters that the optimization algorithm can adjust to find the optimal solution. In scheduling, these variables could include task start times, durations, or assignment of resources. Constraints are conditions that the solution must satisfy. Examples of constraints in scheduling include resource availability, task dependencies, time windows, and other business rules or data extracted from entity transport data 124. Constraints are conditions that the solution must satisfy. In an example applying an optimization algorithm, the objective function may be to minimize the total time a user spends waiting at intermodal terminal 112. The decision variables may be appointment start times, appointment durations, and other data extracted from entity transport data 124. Constraints may be intermodal terminal 112 capacity, time windows for appointments, travel time between intermodal terminal 112, and any specific requirements for handling certain types of goods. An optimization algorithm, such as a scheduling algorithm or mixed-integer programming may generate optimal appointment time and schedules for user appointments while considering constraints and minimizing total waiting times.

Still referring to FIG. 1, scheduling machine-learning model 132 may include a regression model to implement an optimization algorithm as described above. A optimization algorithm may be used during the training phase of a regression model to find the optimal set of parameters that minimize the difference between predicted and actual values. Using regression models for appointment scheduling in the context of transportation involves predicting the duration of each appointment based on various factors. Regression models are particularly useful when there is a need to estimate a numerical value, such as the time required for a specific task. Regression models may include linear regression, decision tree regression, or more complex models like random forest regression or gradient boosting regression. Implementing a regression model may include gathering historical data on past appointments, including details such as appointment start times, locations, types of goods, and the actual durations of each appointment. When a user schedules an appointment, processor 104 can use the regression model to estimate the appointment duration time. This information is valuable for optimizing the overall scheduling process, allowing optimal allocation of resources more effectively and reducing waiting times.

Still referring to FIG. 1, processor 104 is configured to generate a terminal event handler as a function of the user input, wherein the terminal event handler is configured to initiate a communication protocol with the respective intermodal terminal of the selected terminal event to convey the plurality of corresponding event parameters. An "event handler," as used herein, is software component configured to manage, coordinate, and respond to terminal events regarding an intermodal terminal. An event handler may be configured to monitor and track the status of the terminal events and the like. Event handlers may include machine-learning process and models as described throughout this disclosure. A "communication protocol," as used herein, is data defining the rules and conventions for how different components or entities in a system can communicate and exchange information when events occur. A communication protocol may standardize a set of events, each uniquely identified and potentially carrying additional parameters. Components express interest in specific events through a registration mechanism, subscribing to the event handler. Events are triggered using a central dispatcher or direct method calls on the event handler, conveying pertinent event details. Components subscribing to events implement callback functions, dictating their response to the occurrence of specific events. The protocol also outlines a standardized data format, error handling procedures, and an unsubscribe mechanism for components to discontinue event notifications when no longer required. This structured approach ensures consistent and organized communication, fostering efficient interaction within the system. In an example, a communication protocol designed for scheduling requests to book appointments at an intermodal terminal, an event named "scheduleAppointmentRequest" is defined. This event encapsulates key parameters such as the unique identifier of the terminal involved ("terminalId"), the requested appointment time ("requestedTime"), and relevant customer information including their ID, name, and contact number. The protocol outlines a mechanism wherein the scheduling system subscribes to this event, expressing its interest in receiving and handling appointment scheduling requests. Upon a scheduling request being triggered, the event handler transmits the necessary information to the scheduling system, enabling it to process the request. This structured protocol ensures a standardized and organized exchange of information, facilitating efficient communication between entities involved in the appointment booking process at the intermodal terminal.

Still referring to FIG. 1, processor 104 may display one or more recommended appointment times 136 through user interface 120 and receive an updated user input 140 regarding selection of a recommend appointment time. Updated user input 140 may interchanged with user input 128 for the remaining process steps of apparatus 100 in embodiments wherein machine-learning is used to generate the plurality of recommend appointments and a user selects a following user input 128 accordingly. After receiving scheduling input, processor 104 is configured to transmit the user input 128 to at least one of the one or more intermodal terminals 112. Transmission may be to a computing device associated with an intermodal terminal. Transmission may be by way of electronic communication, such as email, text, and the like. Transmission may be through a user interface 120 portal, such as a portal accessible by operators of an intermodal terminal 112. Processor 104 may populate one or more appointment slots on a website of the intermodal terminal 112 communicatively connected to apparatus 100. In some cases, processor 104 may be configured to schedule multiple appointments on multiple websites associated with differing intermodal terminals 112. Generally, appointment creation requires a separate form and/or input for each appointment created. As a result, a booking of multiple appointments may require a vast amount of time in which users must navigate through various websites and input the same or similar information. Therefore, application of apparatus 100 to transmit scheduling inputs to a plurality of intermodal terminal 112 scheduling website in lieu of a user optimizes the scheduling process overall. For example, transmission of scheduling inputs may include API (Application Programming Interface) to programmatically interact with scheduling websites or system to make reservations, scheduling appointments, and the like. An API, or Application Programming Interface, as used herein, is a set of rules and protocols that allows one software application to interact with another. It defines the methods and data formats that applications can use to request and exchange information. APIs are fundamental to modern software development, enabling different software components to communicate, integrate, and work together. Communication with an API involves sending requests and receiving responses. Requests specify the desired action (e.g., retrieve data, update information), and responses contain the result of that action. Using an API, processor 104 may transmit a request to a scheduling website containing the user input 128 and receive a response. API formats may include JSON (JavaScript Object Notation) and XML (eXtensible Markup Language). These formats ensure that data can be easily understood and processed by different applications.

Still referring to FIG. 1, processor 104 is configured to receive one or more scheduling responses as a function of scheduling input. A "scheduling response," as used herein, is information pertaining to confirmation or rejection to a scheduling input. In light of a scheduling response 144 containing a rejection to a scheduling input, processor 104 may take the rejection and retrain scheduling machine-learning model 132 and generate updated recommended appointment times 136 based on the rejection. For example, the rejection to an appointment time may be used as a constraint in optimization algorithm in determining updated recommend appointment times. As a function of a scheduling response 144 containing a confirmation, an appointment confirmation may be communicated to a user through user interface 120 or transmitted as an electronic communication to a user operated computing device, for each confirmed appointment time.

Still referring to FIG. 1, processor 104 is configured to modify the user interface data structure by updating the integrated terminal event dataset as a function of the plurality of corresponding event parameters. Modifications may include updates to a terminal event status, adjustments to available time slots, and the like. Modification may include modifying windows of user interface 120 as described in FIG. 6. As a result, a user may view the status of a container such as the location, the expected arrival time, the time slots scheduled for intermodal transfers and the like. The entity transport data 124 may be viewed through a user interface 120 wherein users may view the appointments of cargo and corresponding information in one software. Entity transport data 124 may include various return times for containers such that users are on notice as to when a container needs to be returned. Additionally, a web crawler or a data scraper may be used to screenshot appointment confirmations and update entity transport data 124. Further the web crawler may be configured to retrieve real time updates with respect to the appointments and update the entity transport data 124 accordingly. Further the web crawler may be configured to screenshot missed appointments and such and update entity transport data 124 wherein users may be able to view missed appointments and take actions accordingly. For example, users may view the missed appointment and realize that a fee or penalty must be paid for the missed appointments.

Figure 2:
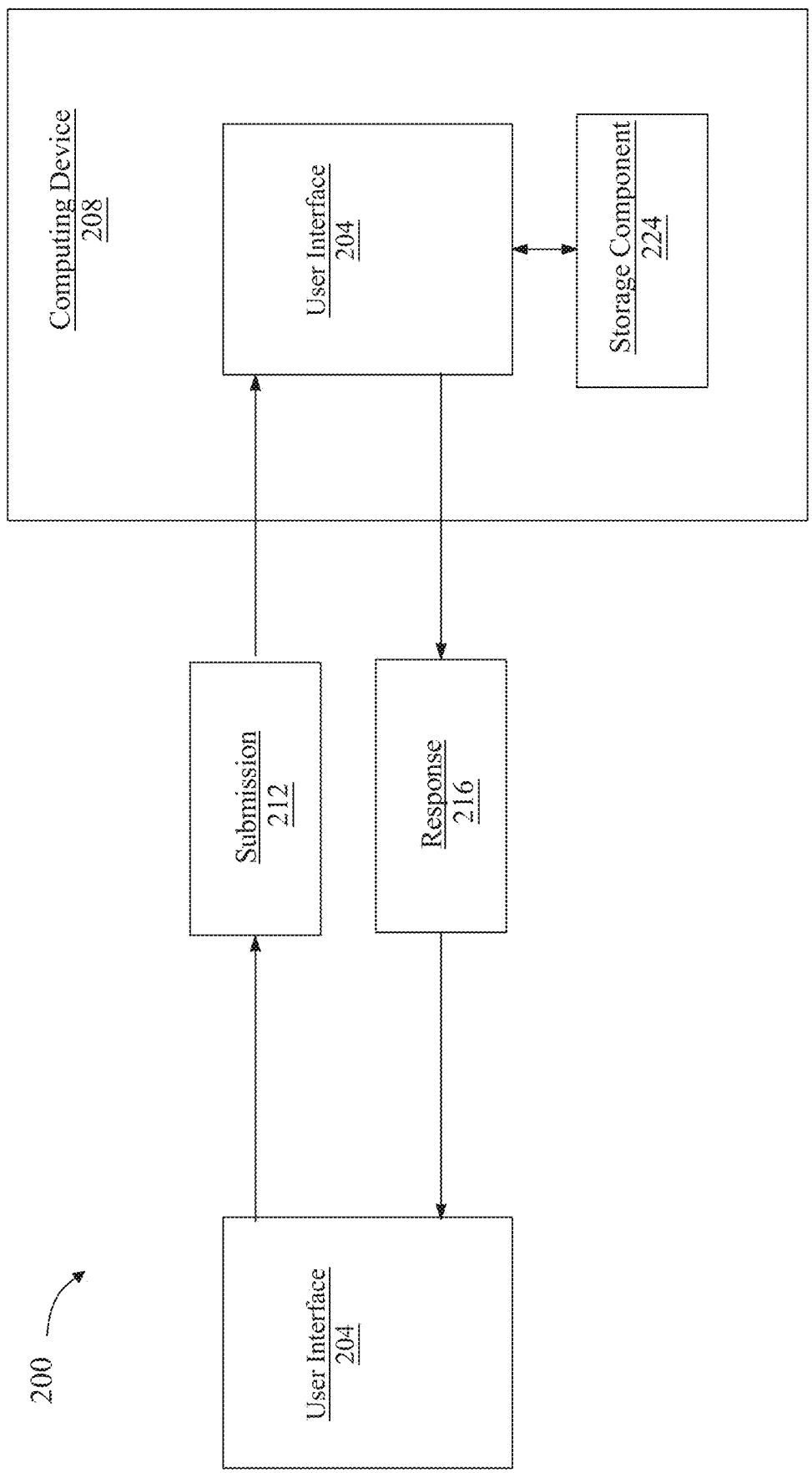
FIG. 2 is a diagram of an exemplary embodiment of a chatbot system.

Referring to FIG. 2, a chatbot system 200 is schematically illustrated. According to some embodiments, a user interface 204 may be communicative with a computing device 208 that is configured to operate a chatbot. In some cases, user interface 204 may be local to computing device 208. Alternatively or additionally, in some cases, user interface 204 may remote to computing device 208 and communicative with the computing device 208, by way of one or more networks, such as without limitation the internet. Alternatively or additionally, user interface 204 may communicate with user device 208 using telephonic devices and networks, such as without limitation fax machines, short message service (SMS), or multimedia message service (MMS). Commonly, user interface 204 communicates with computing device 208 using text-based communication, for example without limitation using a character encoding protocol, such as American Standard for Information Interchange (ASCII). Typically, a user interface 204 conversationally interfaces a chatbot, by way of at least a submission 212, from the user interface 208 to the chatbot, and a response 216, from the chatbot to the user interface 204. In many cases, one or both submission 212 and response 216 are text-based communication. Alternatively or additionally, in some cases, one or both of submission 212 and response 216 are audio-based communication.

Continuing in reference to FIG. 2, a submission 212 once received by computing device 208 operating a chatbot, may be processed by a processor 220. In some embodiments, processor 220 processes a submission 2112 using one or more of keyword recognition, pattern matching, and natural language processing. In some embodiments, processor employs real-time learning with evolutionary algorithms. In some cases, processor 220 may retrieve a pre-prepared response from at least a storage component 224, based upon submission 212. Alternatively or additionally, in some embodiments, processor 220 communicates a response 216 without first receiving a submission 212, thereby initiating conversation. In some cases, processor 220 communicates an inquiry to user interface 204; and the processor is configured to process an answer to the inquiry in a following submission 212 from the user interface 204. In some cases, an answer to an inquiry present within a submission 212 from a user device 204 may be used by computing device 104 as an input to another function.

Figure 3:
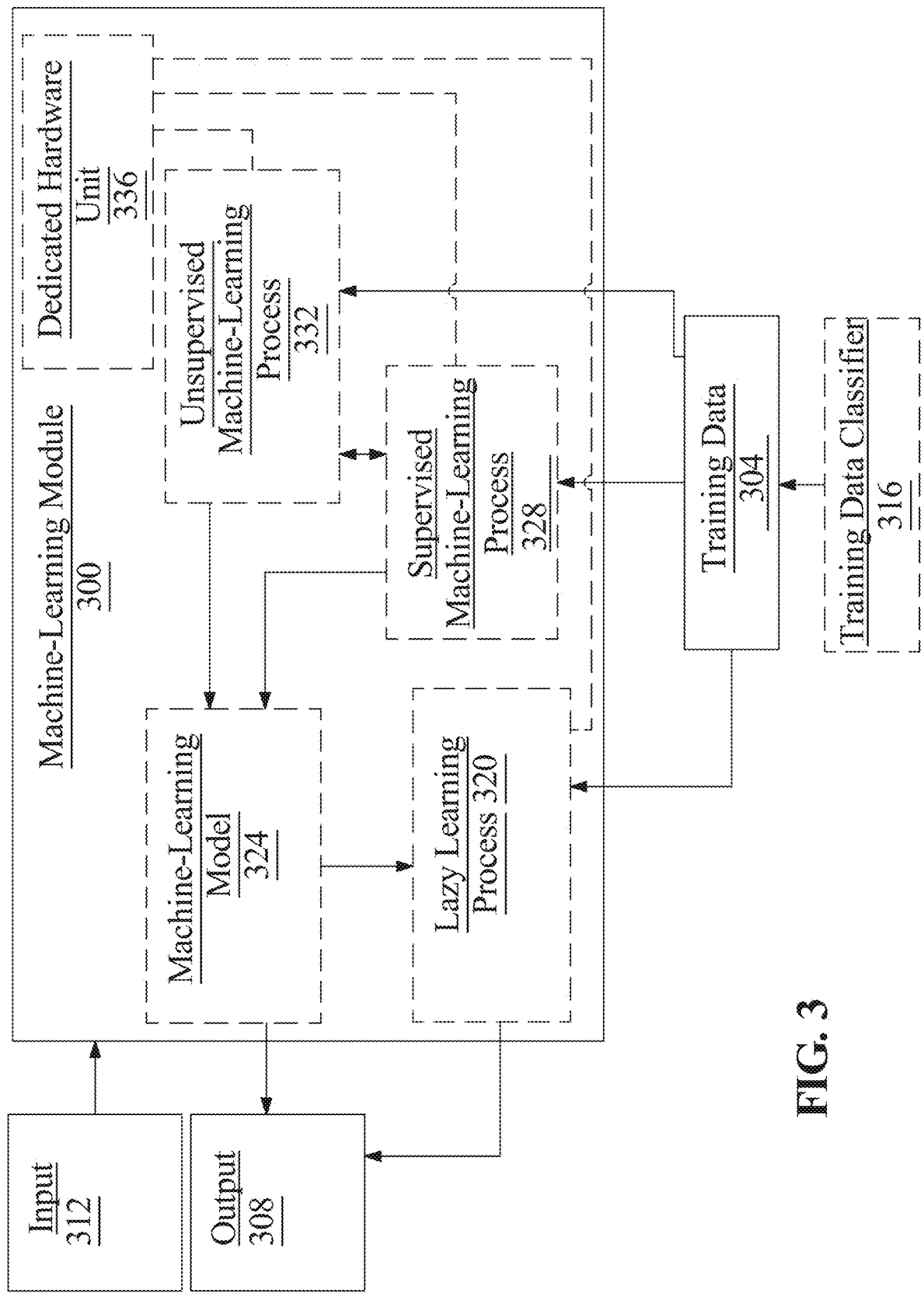
FIG. 3 is a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, scheduling machine-learning model 132 training data includes a plurality of data sets correlating appointment datasets 116 to entity transport data 124.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to categories of entity transport data, such as load type, transport type, geographic location, historical data regarding appointment duration and the like. This classification of training data improves the function of a machine-learning model by optimizing the training performed by the processor to curate unique outputs based on the information.

Still referring to FIG. 3, computing device 304 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)=P(B)$, where $P(A/B)$ is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 304 may then calculate a likelihood table by calculating probabilities of different data entries and classification labels. Computing device 304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device 304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm: $l=\sqrt{\Sigma_{i=0}^{n}a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$:

$$X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may inputs as described in this disclosure as inputs, outputs as described in this disclosure as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
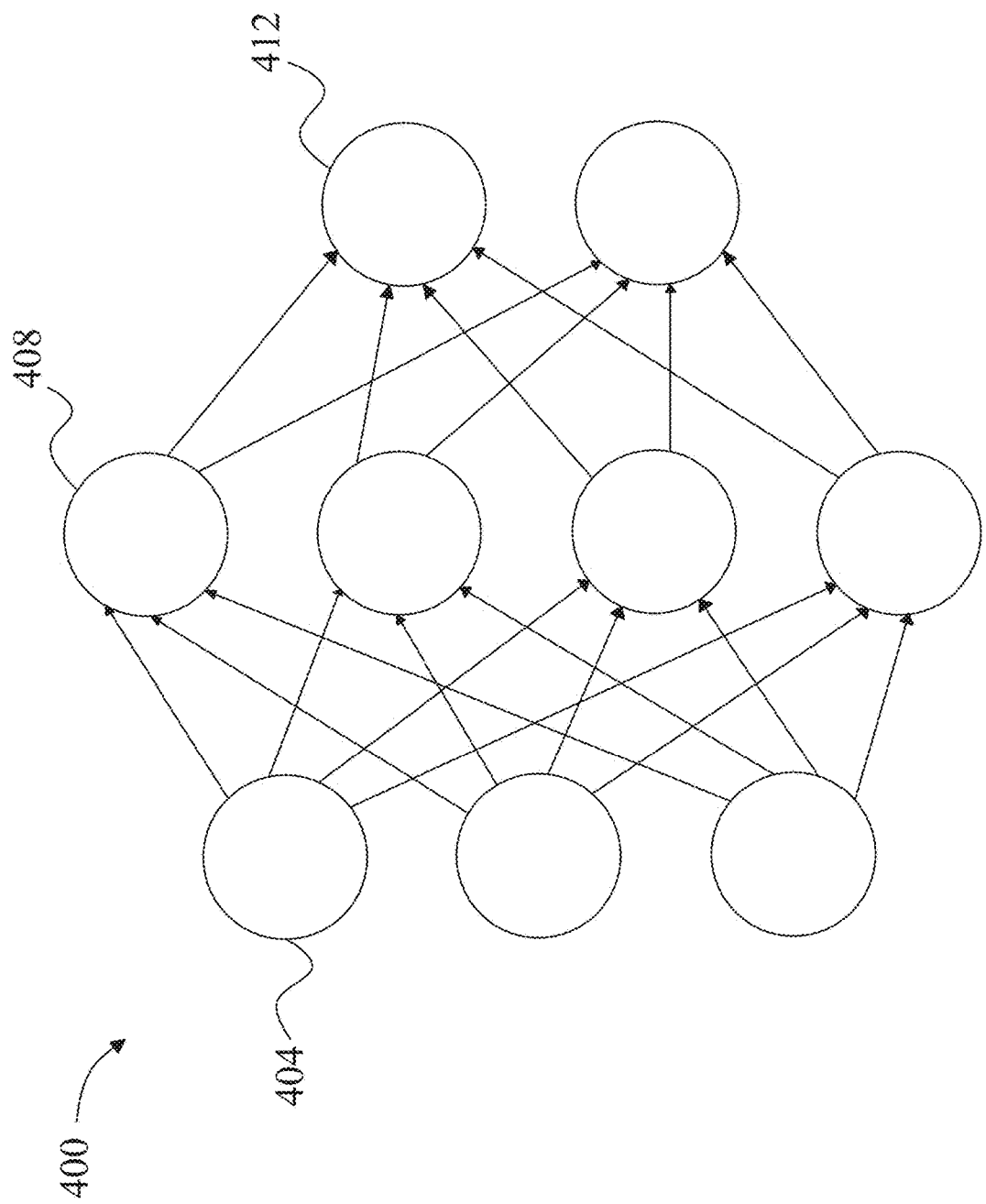
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
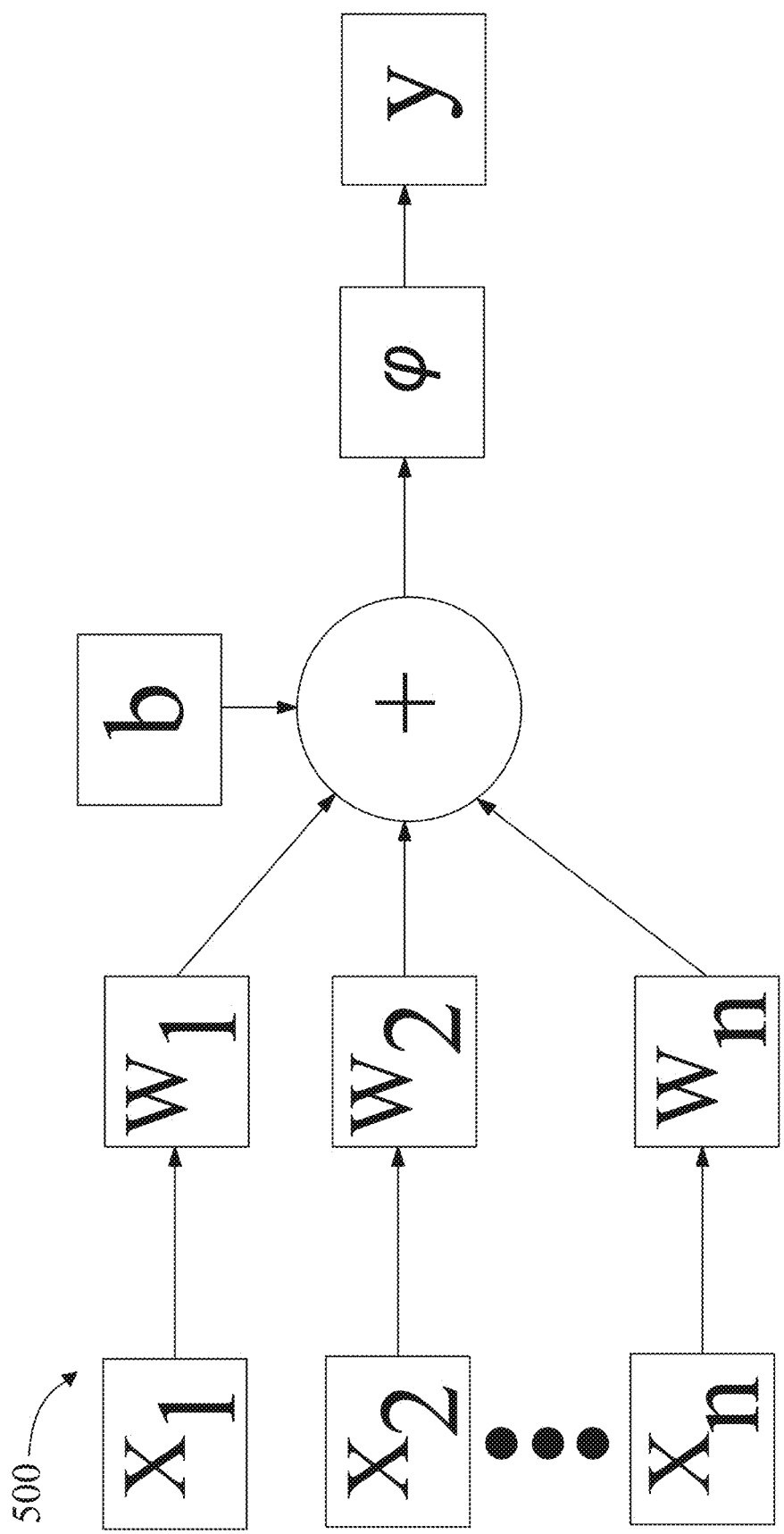
FIG. 5 is a diagram of an exemplary embodiment of a node of a neural network.

Referring now to FIG. 5, an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function q, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
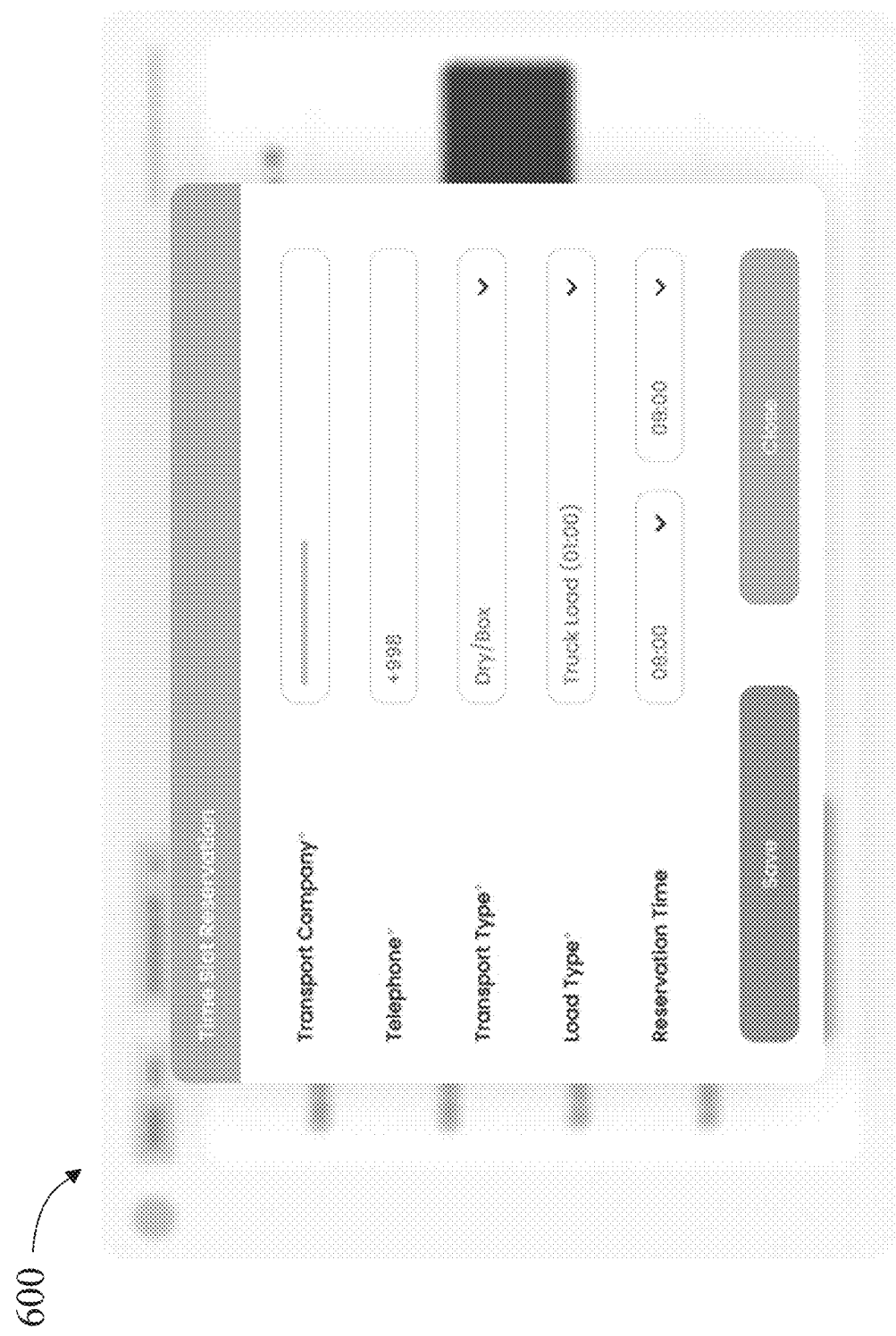
FIG. 6 is a representative screenshot of a user interface for receiving entity data and scheduling inputs.

Referring now to FIG. 6, an exemplary embodiment of a user interface for receiving entity data and scheduling inputs is illustrated. User interface 600 may be configured to display and modify the integrated terminal event dataset use as described below, for example a terminal event status of the integrated terminal even dataset may be updated based on user inputs. User interface 600 may open a separate window containing a plurality of input fields categorized by entity data and scheduling inputs. For example, input fields may be labeled to receive a name of the transport company to enter an intermodal terminal along with the telephone number, transport type, load type, and desired reservation/appointment time. In some embodiments, user interface may include a dashboard categorizing the appointment/event status for each user/scheduling input received by windows labeled missed, regarding missed appointments, completed, regarding complete appointments, in progress, appointments in progress, confirmed, regarding confirmed appointment reservations, tentative, regarding not yet confirmed or rejected appointment reservations, and rejected, regarding rejected scheduling inputs. The dashboard may allow a user to easily keep track of requests and appointments submitted. Visualized dashboards & automated communications enable control of resources, eliminating manual work, spreadsheets, document management and phone calls keeping all stakeholders in sync. In some embodiments, user interface 600 may allow processor 104 and/or user to schedule all import, export, empty and chassis appointments via a single window as TERMPoint prompts, eModal prompts, and the like for the required information based on selection. In some embodiments, user interface 600 may include a watch list window configured to display tracked import containers related to a user by entity transport data and received notifications when containers are ready for appointments.

Still referring to FIG. 6, user interface 600 may allow for a user, such as a dispatcher, to input customer information, port location for transaction/load event to occur, and consignee information. Additionally, user interface may be configured to display routes for user selection. For example, a user may select for the load "Pick and Run," "Drop & Hook," "Prepull," "Live Unload," "One Way Move," "Shunt," any combination thereof and the like. A "Pick and Run" route, often associated with intermodal transportation, refers to a process where a truck driver picks up a container from one location and immediately transports it to its destination without any intermediate stops or transfers. "Drop & hook" is a term used in the trucking industry to describe the process of dropping off one trailer and picking up another without waiting at the facility. A "Prepull" refers to the process of pulling a container from its storage location or staging area in preparation for a scheduled pickup or delivery. "Live Unload" is a situation where the driver arrives at the destination, and the cargo is unloaded immediately upon arrival. A "One Way Move" is a transportation trip involving the movement of a container or cargo from one point to another without returning to the origin. "Shunt" refers to the movement of containers or trailers within a facility or yard to rearrange or position them for loading, unloading, or further transportation.

Figure 7:
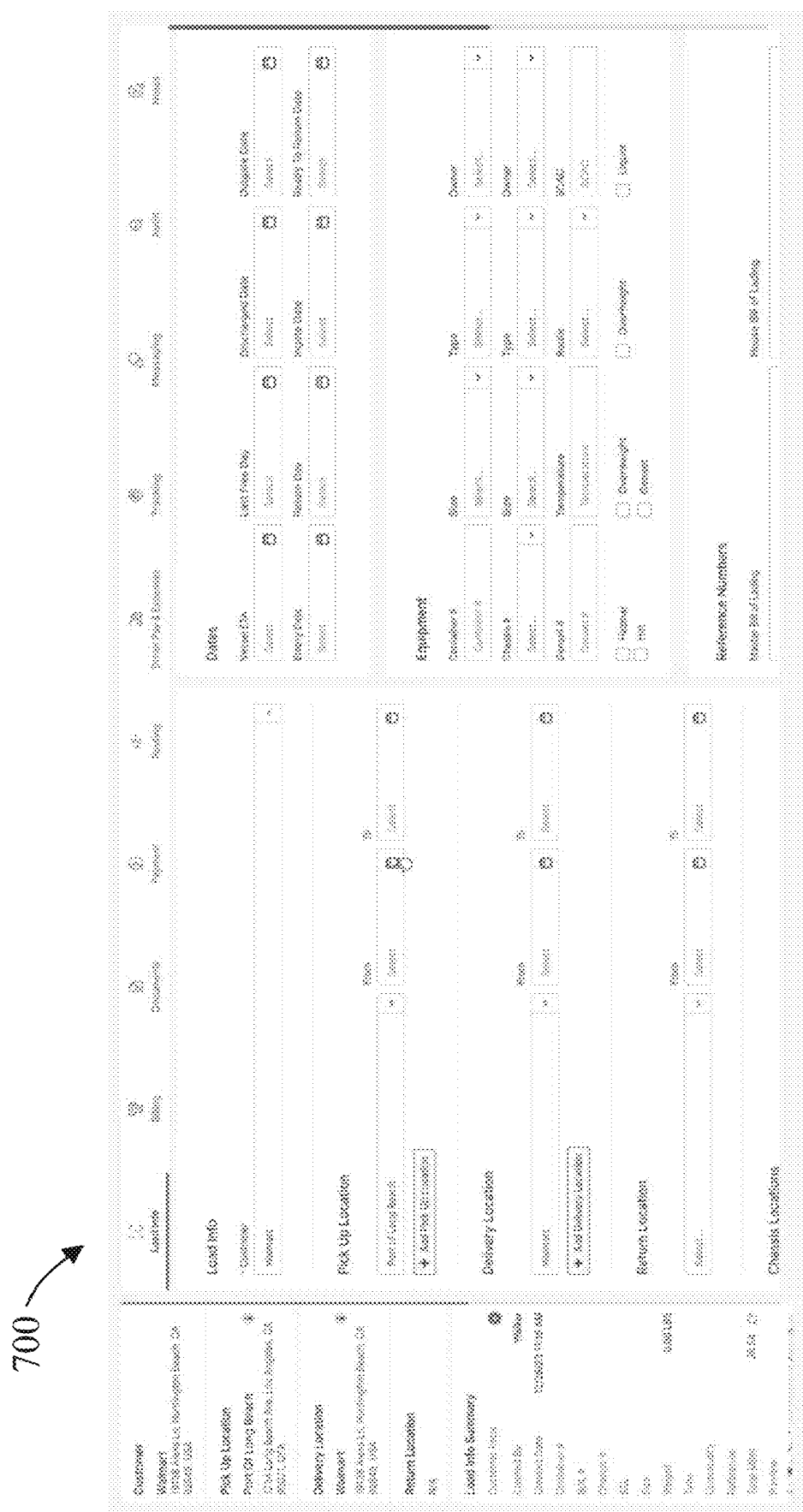
FIG. 7 is a representative screenshot of a user interface for displaying load information.

Referring now to FIG. 7, an exemplary embodiment of a user interface 700 for displaying load information. Load information may be manually input by a user. Load information may be populated by apparatus 100 using a web crawler, API integration, and any other data gathering method as described throughout this disclosure. User interface 700 may include "Load info," wherein customer information and appointments scheduled may be displayed using the "from and "to" boxes. User interface 700 may include "Pick Up Location," and "Delivery Location," information as described above. User interface 700 may include "Return Location" information which may display the location a vessel, container, load, and the like may be returned after a transaction/load event has occurred or been completed. User interface 700 may include "Chassis Locations" information, wherein location and availability for a chassis pickup or drop off may be displayed. In the context of transportation and logistics, a chassis refers to a wheeled frame or undercarriage used to support and transport containers.

Still referring to FIG. 7, user interface 700 may include a "Dates" window configured to display "Vessel Estimate Time of Arrival (ETA)," "Last Free Day," Empty Date," "Discharged Date," "Ingate Date," "Outage Date," and "Ready To Return Date". The Vessel ETA refers to the estimated time at which a vessel is expected to arrive at its destination port. It provides valuable information to stakeholders in the supply chain, allowing them to plan for the arrival of cargo and coordinate subsequent transportation and distribution activities. The Last Free Day is the final day during which a container can be picked up from the port or terminal without incurring additional charges. After the last free day, demurrage, detention, or other storage fees may be applied, encouraging the prompt removal of containers to avoid extra costs. As used in this disclosure, "detention" is a fee applied when a container remains at the terminal beyond the free allotted time agreed upon in the shipping contract. "Demurrage," as used in this disclosure, is a charge incurred when a container is held outside of the terminal, such as at a warehouse or other facility, beyond its free time period. The Empty Date is the date on which a shipping container is returned to the port or designated location after being emptied of its cargo. It marks the completion of the unloading process and signifies that the empty container is ready for repositioning or further transportation. The Discharged Date is the date on which a container is unloaded from a vessel at the destination port. The Ingate Date refers to the date on which a container enters a terminal or facility. The Outgate Date is the date on which a container leaves a terminal or facility. The Ready To Return Date is the date on which an empty container is considered ready to be returned to the shipping line or leasing company. Apparatus 100 may be configured to iteratively update load information.

Still referring to FIG. 7, user interface 700 may include a "Equipment" window configured to display information related to "Container Number (#)," "Size" "Type," "Owner," "Chassis Number (#), "Genset Number (#), "Temperature," "Standard Carrier Alpha Code (SCAC)," and the like. The Container Number is a unique identifier assigned to a shipping container. It is typically a combination of letters and numbers. The Size of a container refers to its dimensions, usually expressed in terms of length, width, and height. The Type of container indicates its design and purpose. The Owner of the container is the entity or company that owns or operates the container. The Chassis Number is a unique identifier for the chassis, the wheeled undercarriage that supports and transports containers. The Genset Number refers to the generator set (genset) attached to a refrigerated container (reefer) to provide power for temperature control. Temperature refers to the temperature setting, or range maintained inside a refrigerated container (reefer). SCAC is a standardized code assigned to transportation companies. It uniquely identifies carriers and logistics service providers. Equipment information may include displaying when equipment is "Hazmat" (Hazardous Materials), "Hot," "Overweight," "Liquor," and the like. Hazmat refers to materials or substances that pose a risk to health, safety, property, or the environment. These can include chemicals, gases, flammable liquids, corrosive materials, and other potentially dangerous substances. In logistics, the term "Hot" can refer to cargo that requires expedited or urgent handling and transportation. Overweight shipments exceed the standard weight limits set by transportation regulations. This can apply to individual cargo items or entire containers. Overheight refers to cargo that exceeds the standard height limits allowed for transportation. Liquor refers to alcoholic beverages, including beer, wine, and spirits. Shipping liquor involves compliance with various regulations, including licensing, taxes, and restrictions on the transport of alcoholic beverages. These terms introduce specific challenges and considerations for logistics professionals, carriers, and shippers. Adhering to regulations, obtaining necessary permits, and ensuring proper handling are essential to transport hazardous materials, hot shipments, overweight cargo, overheight cargo, and liquor safely and efficiently.

Still referring to FIG. 7, user interface 700 may include a "Reference Numbers" window configured to display information related to Master Bill of Lading (MBL), House Bill of Lading (HBL), and the like. The Master Bill of Lading (MBL) is a document issued by the ocean carrier or its agent to acknowledge the receipt of cargo for shipment. It serves as the primary contract of carriage between the shipper and the ocean carrier. The House Bill of Lading (HBL) is a separate bill of lading issued by a freight forwarder or a consolidator. The HBL is issued to the actual shipper or the party that initially tendered the cargo to the logistics provider.

Figure 8:
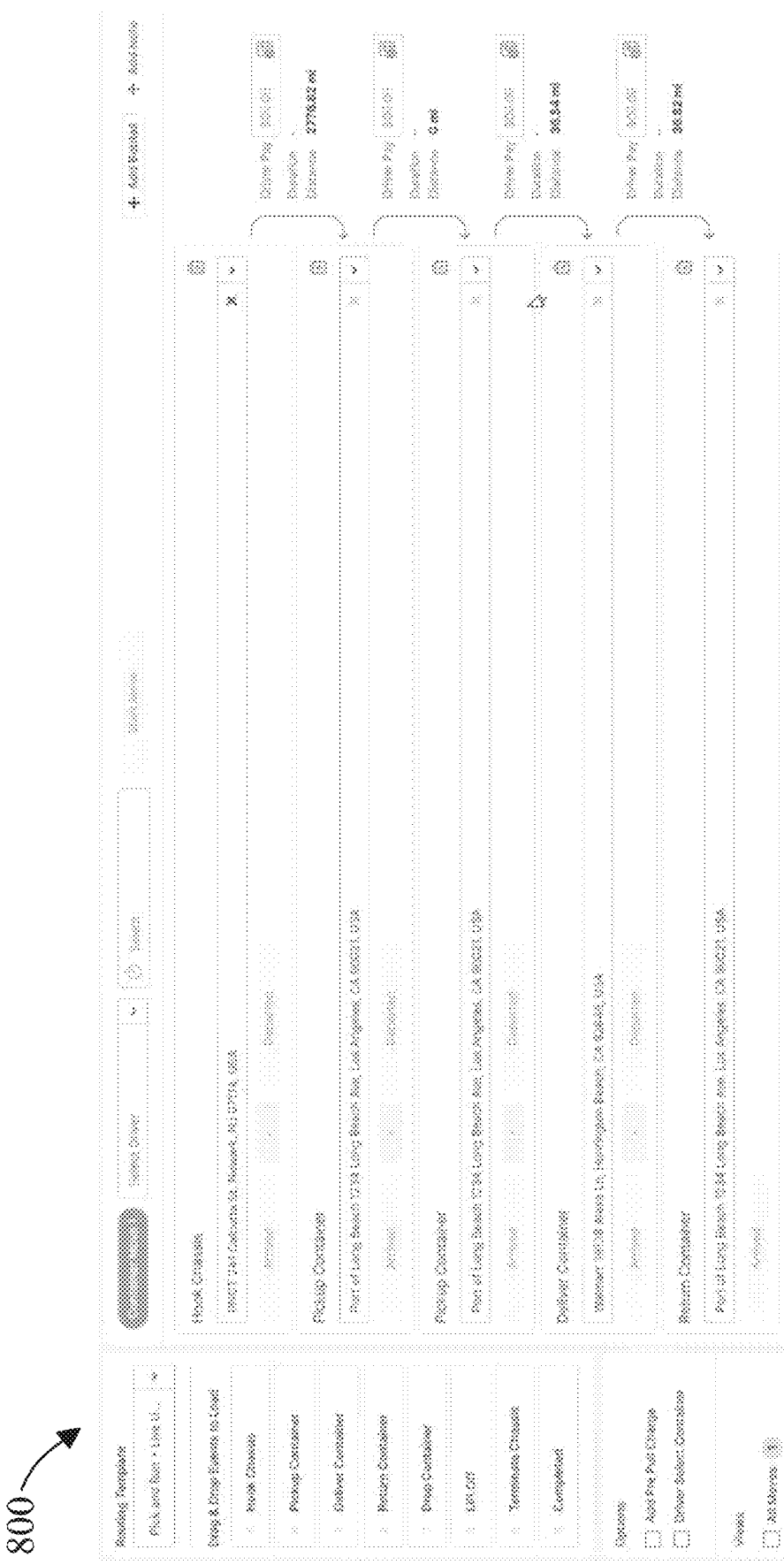
FIG. 8 is a representative screenshot of a user interface for displaying route information.

Referring now to FIG. 8, an exemplary embodiment of a user interface 800 for displaying route information. Route information refers to details about the path or course taken by a vehicle, shipment, or individual from one location to another. Route information may include displays as disclosed above such as the pickup location. Route information may include identification of the starting point (origin) and the endpoint (destination) of the route. Route information may include any planned stops or waypoints along the route, indicating where the vehicle or shipment will pause or undergo a specific action, such as loading/unloading, refueling, or rest. Route information may include specification of the modes of transportation used for different segments of the route (e.g., truck, train, ship, airplane). Route information may include planned departure time from the origin and the estimated or scheduled arrival time at the destination or intermediate stops. Route information may include the expected time at which the vehicle or shipment will arrive at specific points along the route and the anticipated departure time from those points. Route information may include the total distance to be covered and the estimated duration of the entire journey. This information helps in planning fuel consumption, rest breaks, and overall trip logistics. Route information may include "Driver Pay," input fields wherein a user may input the pay they wish for a driver to receive for the load event/transaction.

Still referring to FIG. 8, in some embodiments, route information and other data as describe herein, may be used to optimize driver workflow. For example, processor 104 may use a machine-learning model to generate an output such as recommended routes, tasks, and the like for a driver. A machine-learning model receive, through a user interface described herein, inputs such as real-time location data of drivers and containers, historical dispatch records, information about available work or tasks, last free day, empty date, and any other data sources as described herein. The machine-learning model may output suggestions on dispatches or work for drivers based on the related input. Outputs may include optimal routes, task suggestion based on a driver's availability and skills, and the like. For example, the machine-learning model may recognize the proximity of an empty container that needs to be returned and suggest or dispatch relevant tasks accordingly based on the route information input related to a driver. The machine-learning model may include algorithms such as recommendation algorithms, predictive modeling for task prioritization, and reinforcement learning for dynamic dispatching decisions. Training data for the machine-learning model may include inputs as described above correlated to driver profiles, historical dispatch records, real-time location data, task characteristics, container/equipment data, and the like.

Still referring to FIG. 8, user interface 800 may allow a user to rearrange the timeline of events for a route. Rearranging events may include adding options such as a chassis pickup to the route plane or deleting events from the route plan. Rearrangement may include changing the order of pickup or drop of events and the like. User interface 800 may include a "Start Move" widget wherein, a user may select to transit the route information to a plurality of drivers or third-party computing devices that are communicatively connected. A driver may accept or reject the route information. User interface 800 may be configured to track and display the arrival and departure of a driver at each event of the route plan. Timestamped notifications may be displayed or transmitted to a user device regarding the progress of a route plan.

Figure 9:
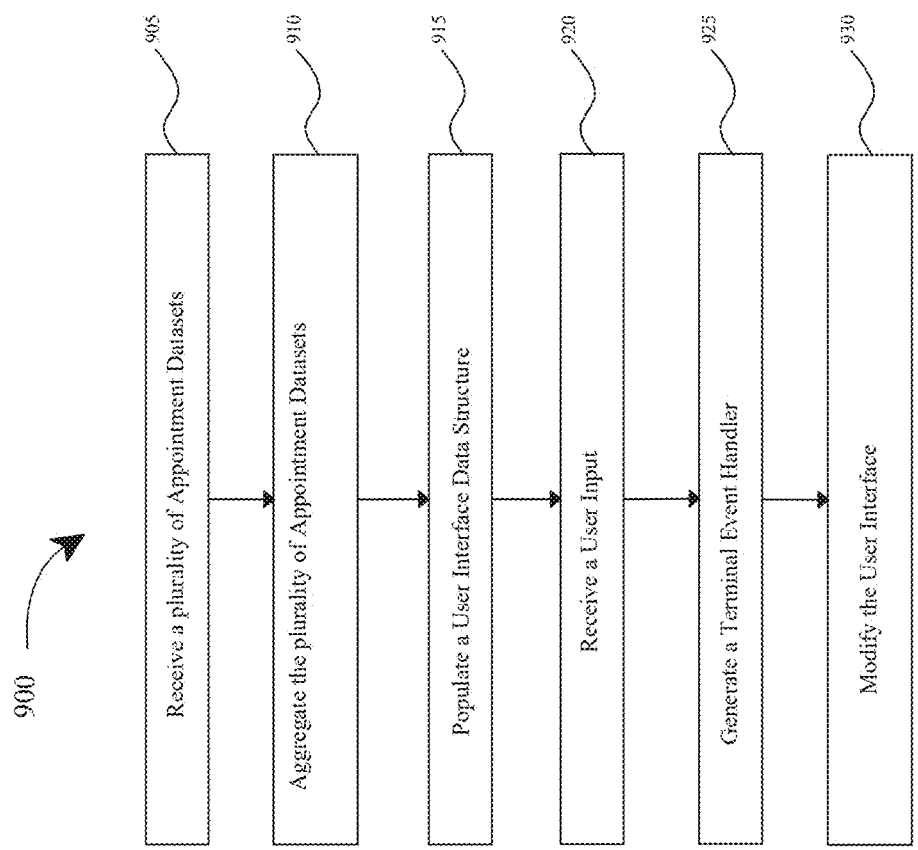
FIG. 9 is exemplary flow chart of a method for communication with an intermodal terminal.

Referring now to FIG. 9, an exemplary flow chart of method 900 for communication with an intermodal terminal. At step 905, method 900 includes receiving, by at least a processor, a plurality of appointment datasets, wherein each appointment dataset of the plurality of appointment datasets includes a plurality of data points describing a plurality of terminal events associated with at least an intermodal terminal. This may be implemented as disclosed in and with reference to FIGS. 1-8. At step 910, method 900 includes aggregating, by the at least a processor, the plurality of appointment datasets by synthesizing the plurality of data points to form an integrated terminal event dataset. This may be implemented as disclosed in and with reference to FIGS. 1-8. At step 915, method 900 includes populating, by the at least a processor, a user interface data structure as a function of the aggregated plurality of appointment datasets, wherein the user interface data structure includes a visual representation of the integrated terminal event dataset. This may be implemented as disclosed in and with reference to FIGS. 1-8. At step 920, method 900 includes receiving, by the at least a processor, a user input from a user through the populated user interface data structure, wherein the user input includes a selection of a terminal event from the plurality of terminal events, and a plurality of corresponding event parameters. This may be implemented as disclosed in and with reference to FIGS. 1-8. At step 925, method 900 includes generating, by the at least a processor, a terminal event handler as a function of the user input, wherein the terminal event handler is configured to initiate a communication protocol with the respective intermodal terminal of the selected terminal event to convey the plurality of corresponding event parameters. This may be implemented as disclosed in and with reference to FIGS. 1-8. At step 930, method 900 includes modifying, by the at least a processor, the user interface data structure by updating the integrated terminal event dataset as a function of the plurality of corresponding event parameters. This may be implemented as disclosed in and with reference to FIGS. 1-8.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
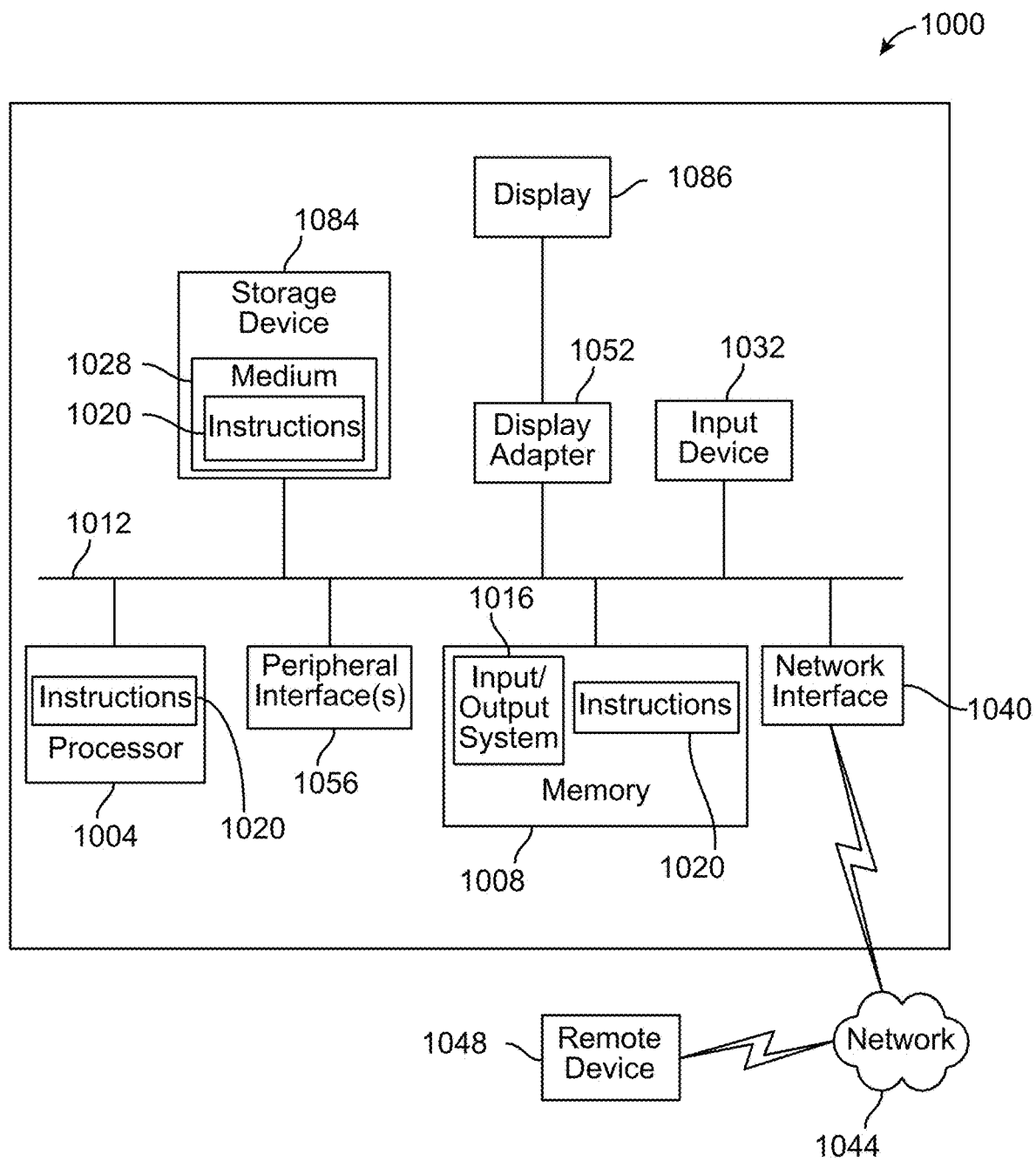
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 10010 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 800, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for communication with an intermodal terminal,
   wherein the apparatus comprises:
   at least a processor; and
   a memory communicatively connected to the at least a processor, wherein the memory contains instructions configuring the at least a processor to:
      receive a plurality of appointment datasets, wherein each appointment dataset of the plurality of appointment datasets comprises a plurality of data points describing a plurality of terminal events associated with at least an intermodal terminal;
      receive entity transport data;
      aggregate the plurality of appointment datasets by synthesizing the plurality of data points to form an integrated terminal event dataset;
      populate a user interface data structure as a function of the aggregated plurality of appointment datasets, wherein the user interface data structure comprises a visual representation of the integrated terminal event dataset;
      receive a user input from a user through the populated user interface data structure, wherein the user input comprises:
         a selection of a terminal event from the plurality of terminal events; and
         a plurality of corresponding event parameters;
      generate a terminal event handler as a function of the user input, wherein the terminal event handler is configured to:
         initiate a communication protocol with the respective intermodal terminal of the selected terminal event to convey the plurality of corresponding event parameters; and
         modify the user interface data structure by updating the integrated terminal event dataset as a function of the plurality of corresponding event parameters, wherein modifying the user interface data structure further comprises: modifying a plurality of windows in the user interface;
         utilizing a web crawler configured to scrape appointment confirmation data, real time updates related to appointments, and missed appointment data from the user interface;
      update entity transport data as a function of one or more of the appointment confirmation data, real time updates related to the appointments, and the missed appointment data;
      generate a plurality of recommended appointment times based on the user input, the updated entity transport data and the integrated terminal event dataset using a scheduling model by:
         receiving training data including a plurality of data sets correlating appointment data to the entity transport data;
         extracting constraints from the entity transport data;
         determining intermodal terminal capacity as a function of the constraints;
         updating the entity transport data as a function of real-time updates of the appointment data and the intermodal terminal capacity;

optimizing the scheduling model during a training phase to minimize a difference between a previously entered recommended appointment time and an updated recommended appointment time;

updating the training data as a function of user feedback and the optimization, wherein updating the training data further comprises:

receiving the user feedback from the user interface associated with a quality of the plurality of recommended appointment times previously entered by the processor; and removing training data associated with a poorly rated output derived from the user feedback;

iteratively training the scheduling model using the updated training data; and outputting, by the scheduling model, the updated recommended appointment time; and transmit the at least an updated recommended appointment time to the user via the user interface.

2. The apparatus of claim 1, wherein the appointment dataset comprises information regarding to an appointment scheduling of an intermodal terminal.

3. The apparatus of claim 1, wherein the web crawler is further configured to scrape appointment data from a website of the intermodal terminal.

4. The apparatus of claim 1, wherein a user input comprises a user selection regarding an appointment time.

5. The apparatus of claim 1, wherein the at least a processor is further configured to transmit the user input utilizing an Application Programming Interface configured to programmatically interact with a website of the intermodal terminal by submission of the user input.

6. The apparatus of claim 1, wherein the user interface data structure comprises a dashboard categorizing the plurality of data points by an event status.

7. The apparatus of claim 1, wherein the user interface data structure comprises a watch list window configured to track and display entity transport data.

8. The apparatus of claim 1, wherein the scheduling model comprises an optimization algorithm configured to optimize an objective function related to minimizing a total appointment duration time based on constraints extracted from the entity transport data.

9. The apparatus of claim 8, wherein the scheduling model comprises a regression model configured to gather historical data to determine an appointment duration time to analyze in generating the plurality of recommend appointment times.

10. A method for communication with an intermodal terminal, wherein the method comprises:

receiving, by at least a processor, a plurality of appointment datasets, wherein each appointment dataset of the plurality of appointment datasets comprises a plurality of data points describing a plurality of terminal events associated with at least an intermodal terminal;

receive entity transport data;

aggregating, by the at least a processor, the plurality of appointment datasets by synthesizing the plurality of data points to form an integrated terminal event dataset;

populating, by the at least a processor, a user interface data structure as a function of the aggregated plurality of appointment datasets, wherein the user interface data structure comprises a visual representation of the integrated terminal event dataset;

receiving, by the at least a processor, a user input from a user through the populated user interface data structure, wherein the user input comprises:

a selection of a terminal event from the plurality of terminal events; and a plurality of corresponding event parameters;

generating, by the at least a processor, a terminal event handler as a function of the user input, wherein the terminal event handler is configured to:

initiate a communication protocol with the respective intermodal terminal of the selected terminal event to convey the plurality of corresponding event parameters; and modifying, by the at least a processor, the user interface data structure by updating the integrated terminal event dataset as a function of the plurality of corresponding event parameters, wherein modifying the user interface data structure further comprises:

modifying a plurality of windows in the user interface;

utilizing a web crawler configured to scrape appointment confirmation data, real time updates related to appointments, and missed appointment data from the user interface;

updating, by the at least a processor, entity transport data as a function of one or more of the appointment confirmation data, real time updates related to the appointments, and the missed appointment data;

generating, by at least a processer, a plurality of recommended appointment times based on the user input, the updated entity transport data and the integrated terminal event dataset using a scheduling model by:

receiving training data including a plurality of data sets correlating appointment data to the entity transport data;

extracting constraints from the entity transport data;

determining intermodal terminal capacity as a function of the constraints;

updating the entity transport data as a function of real-time updates of the appointment data and the intermodal terminal capacity;

optimizing the scheduling model during a training phase to minimize a difference between a previously entered recommended appointment time and an updated recommended appointment time;

updating the training data as a function of user feedback and the optimization, wherein updating the training data further comprises:

receiving the user feedback from the user interface associated with a quality of the plurality of recommended appointment times previously entered by the processor; and removing training data associated with a poorly rated output derived from the user feedback;

iteratively training the scheduling model using the updated training data; and outputting, by the scheduling model, the updated recommended appointment time; and transmitting, by the at least a processor, the at least an updated recommended appointment time to the user via the user interface.

11. The method of claim 10, wherein the appointment dataset comprises information associated with an appointment scheduling of an intermodal terminal.

12. The method of claim 10, wherein the web crawler is further configured to scrape appointment data from a website of the intermodal terminal.

13. The method of claim 10, wherein a user input comprises a user selection regarding an appointment time.

14. The method of claim 10, wherein the at least a processor is further configured to transmit the user input utilizing an Application Programming Interface configured to programmatically interact with a website of the intermodal terminal by submission of the user input.

15. The method of claim 10, wherein the user interface data structure comprises a dashboard categorizing the plurality of data points by an event status.

16. The method of claim 10, wherein the user interface data structure comprises a watch list window configured to track and display entity transport data.

17. The method of claim 10, wherein the scheduling model comprises an optimization algorithm configured to optimize an objective function related to minimizing a total appointment duration time based on constraints extracted from the entity transport data.

18. The method of claim 17, wherein the scheduling model comprises a regression model configured to gather historical data to determine an appointment duration time to analyze in generating the plurality of recommend appointment times.

* * * * *